United States Patent
Yang et al.

(10) Patent No.: US 9,938,183 B2
(45) Date of Patent: Apr. 10, 2018

(54) SEALING GLASS PASTE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/769,195

(22) PCT Filed: Feb. 12, 2015

(86) PCT No.: PCT/CN2015/072917
§ 371 (c)(1),
(2) Date: Aug. 20, 2015

(87) PCT Pub. No.: WO2016/065774
PCT Pub. Date: May 6, 2016

(65) Prior Publication Data
US 2016/0251258 A1    Sep. 1, 2016

(30) Foreign Application Priority Data
Oct. 28, 2014 (CN) .......................... 2014 1 0587634

(51) Int. Cl.
| | | |
|---|---|---|
| *C03C 8/24* | (2006.01) | |
| *C03C 3/14* | (2006.01) | |
| *C03C 3/19* | (2006.01) | |
| *C03C 3/21* | (2006.01) | |
| *C03C 8/04* | (2006.01) | |
| *C03C 8/08* | (2006.01) | |
| *C03C 8/16* | (2006.01) | |

(52) U.S. Cl.
CPC .................. *C03C 8/24* (2013.01); *C03C 3/14* (2013.01); *C03C 3/19* (2013.01); *C03C 3/21* (2013.01); *C03C 8/04* (2013.01); *C03C 8/08* (2013.01); *C03C 8/16* (2013.01); *C03C 2204/00* (2013.01); *C03C 2205/00* (2013.01)

(58) Field of Classification Search
CPC ....................................................... C03C 8/24
See application file for complete search history.

(56) References Cited

U.S. PATENT DOCUMENTS

| | | | | |
|---|---|---|---|---|
| 4,882,301 | A * | 11/1989 | Gettys | C03C 8/14 501/14 |
| 6,362,119 | B1 * | 3/2002 | Chiba | C03C 14/004 501/15 |
| 6,589,894 | B1 * | 7/2003 | Mito | C03C 3/066 501/17 |
| 7,560,401 | B2 * | 7/2009 | Prunchak | C03C 1/00 501/14 |
| 8,367,573 | B2 * | 2/2013 | Naito | C03C 3/062 136/256 |
| 2005/0151151 | A1 * | 7/2005 | Hawtof | B32B 27/00 257/100 |
| 2006/0003883 | A1 | 1/2006 | Yoshida et al. | |
| 2008/0226863 | A1 * | 9/2008 | Prunchak | B32B 17/10036 428/98 |
| 2009/0205371 | A1 * | 8/2009 | Chen | B81C 1/00293 65/36 |
| 2009/0242017 | A1 * | 10/2009 | Yasuda | B32B 17/10036 136/252 |
| 2012/0202030 | A1 * | 8/2012 | Kondo | B32B 17/06 428/215 |
| 2013/0104980 | A1 * | 5/2013 | Sridharan | B81C 1/00317 136/259 |
| 2013/0164486 | A1 * | 6/2013 | Yamada | C03C 8/04 428/76 |
| 2013/0174608 | A1 * | 7/2013 | Takeuchi | C03C 3/14 65/40 |
| 2014/0013804 | A1 | 1/2014 | Ono et al. | |
| 2014/0026619 | A1 * | 1/2014 | Maloney | C03B 23/245 65/43 |
| 2014/0141236 | A1 | 5/2014 | Magdassi et al. | |
| 2015/0266772 | A1 * | 9/2015 | Mitsui | C03C 8/24 428/76 |
| 2016/0236968 | A1 * | 8/2016 | Shiragami | C03C 8/24 |

FOREIGN PATENT DOCUMENTS

| CN | 1787978 A | 6/2006 |
|---|---|---|
| CN | 101767936 A | 7/2010 |
| CN | 102574371 A | 7/2012 |
| CN | 1013124881 A | 5/2013 |

(Continued)

OTHER PUBLICATIONS

International Search Report & Written Opinion of the International Searching Authority Appln. No. PCT/CN2015/072917; Dated Jul. 1, 2015.

(Continued)

*Primary Examiner* — Karl E Group
(74) *Attorney, Agent, or Firm* — Ladas & Parry LLP

(57) ABSTRACT

A sealing glass paste for reducing the laser energy required during a sealing process. The sealing glass paste comprises a light absorbing material.

7 Claims, No Drawings

(56) References Cited

FOREIGN PATENT DOCUMENTS

| CN | 103328403 A | 9/2013 |
| CN | 103964695 A | 8/2014 |
| CN | 104045236 A | 9/2014 |
| WO | 2010137667 | * 12/2010 |

OTHER PUBLICATIONS

First Chinese Office Action Appln. No. 201410587634.1; Dated Mar. 4, 2016.
Second Chinese Office Action dated Aug. 26, 2016, Appln. No. 201410587634.1.

* cited by examiner

SEALING GLASS PASTE

TECHNICAL FIELD

The embodiments of the present invention relate to a sealing glass paste.

BACKGROUND

In order to ensure a stable work state of an electronic device, the electronic device needs to be sealed with a sealing glass paste.

Glass materials are common sealing materials. The sealing process mainly includes: 1) producing a glass material into glass powders and then into a glass paste; 2) coating the glass paste on the joints; 3) heating and burning out the carrier material in the glass paste; 4) melting the glass paste in which the carrier material has been removed using a heat source, to seal the device. Currently, the melting in step 4) is carried out mostly by using laser heat melting method, that is, by using laser energy to heat the glass paste.

SUMMARY

An embodiment of the present invention provides a sealing glass paste for reducing the laser energy required during the sealing process.

An embodiment of the present invention provides a sealing glass paste comprising a light absorbing material.

Optionally, the sealing glass paste comprises glass powders, a ceramic filler, a light absorbing material, a resin and a solvent.

Optionally, the mass percentage contents of the glass powders, the ceramic filler, the light absorbing material, the resin and the solvent are: glass powders 20%-50%; ceramic filler 5%-25%; light absorbing material 0.5%-5%; resin 10%-25%; and solvent 20%-40%.

For example, furthermore, the ratio of the weight percentage contents of the glass powders and the ceramic filler is 2:1-10:1.

Optionally, the weight percentage content of the light absorbing material is 3%-5%.

Optionally, the glass powders are selected from at least one of vanadium pentoxide, phosphorus pentoxide, zinc oxide, barium oxide and boron trioxide.

Optionally, the ceramic filler is selected from at least one of aluminum oxide, silicon dioxide, zirconium dioxide, titanium dioxide and magnesium oxide.

Optionally, the light absorbing material is selected from at least one of silicon carbide, copper chrome black and iron manganese black.

Optionally, the resin is selected from cellulosic resin or epoxy resin.

Optionally, the solvent is selected from at least one of terpineol, diethylene glycol butyl ester acetate, dipropyl ether, diethylene glycol monobutyl ester, 1,2-propylene oxide carbonate, ethylene glycol carbonate, triphenyl phosphate and tritolyl phosphate.

Another embodiment of the present invention provides a preparation method of the sealing glass paste provided in the above technical solution, which comprises adding a light absorbing material into the sealing glass paste.

DETAILED DESCRIPTION

Hereinafter, the technical solutions of the embodiments of the present invention will be described in a clearly and fully understandable way. Apparently, the described embodiments are just part of but not all of the embodiments of the invention. Based on the described embodiments herein, those skilled in the art can obtain other embodiments without any inventive work, which should be within the scope of the invention.

In actual production, the inventors of the present invention found that glass pastes generally comprise strong reflective components. When heating with lasers, the laser energy would be wasted due to the reflection of those components in the glass pastes, thus the glass pastes can not reach complete molten state. Therefore, higher laser power is required to be provided for heating the glass pastes. In this way, however, the temperature of the substrate and the sealing material would be increased instantly, thereby resulting in the breakdown of relevant component functions, especially for the encapsulation of organic light emitting displays in which the laser sealing process is needed to be controlled more strictly. Therefore, providing a sealing glass paste which can utilize laser energy effectively is an important task faced by a person skilled in the art.

An embodiment of the present invention provides a sealing glass paste comprising a light absorbing material. The light absorbing material added in the embodiment of the present invention can absorb laser energy effectively, thereby reducing the laser energy required in the sealing process.

An embodiment of the present invention provides a sealing glass paste. Because a light absorbing material is added into the sealing glass paste, the light absorbing material can absorb energy effectively during the sealing of electronic products, thereby reducing the laser energy provided in the sealing process effectively while ensuring the sealing performance requirements. In this way, not only the adverse effects of the heat shock regenerated during laser sealing on products can be reduced, but also the energy consumption can be reduced significantly.

In an optional embodiment of the present invention, the sealing glass paste comprises glass powders, a ceramic filler, a light absorbing material, a resin and a solvent.

Glass powders are amorphous hard particles and generally are disordered glass isotropic solid formed by mixing PbO, $SiO_2$, $TiO_2$ and other electronic materials and then carrying out a solid phase reaction at high temperature. Glass powders have advantages of stable chemical property, good corrosion resistance, good transparency and high hardness. For example, in actual production, glass powders are typically used as the main component of the sealing glass material. In the sealing glass paste provided in the embodiment of the present invention, a ceramic filler is further added for improving mechanical performance of the glass powders and adjusting the coefficient of expansion of the glass powders, to obtain a sealing glass paste with excellent performances.

In an embodiment of the present invention, the mass percentage contents of the glass powders, the ceramic filler, the light absorbing material, the resin and the solvent are: glass powders 20%-50%; ceramic filler 5%-25%; light absorbing material 0.5%-5%; resin 10%-25%; and solvent 20%-40%.

An embodiment of the present invention provides a formulation of sealing glass paste in which a weight percentage content of 0.5%-5% of light absorbing material is added. The weight percentage content of the light absorbing material is limited to the above range mainly for the following reasons. If the weight percentage content of the light absorbing material added is lower than 0.5%, the laser energy required during the laser sealing would be higher such that the temperature of the substrate and the sealing material would be greatly increased instantly. The excessively high temperature tends to result in the breakdown of relevant component functions. Meanwhile, the excessively rapid temperature increasing would result in large transient stress, thereby resulting in the damage or cracking of the sealing material and finally resulting in the inefficiency of products. On the contrary, if the weight percentage content of the light absorbing material added is higher than 5%, the temperature of the substrate and the sealing material would be increased slowly, and a longer time would be consumed for the heat melting of the sealing material, thereby lengthening the process cycle and increasing the production cost. Therefore, the weight percentage content of the light absorbing material added into the formulation provided by the embodiment of the present invention is limited within the range of 0.5%-5%. In a preferred embodiment of the present invention, the weight percentage content of the light absorbing material is 3%-5%. Within this preferred percentage content range, the production cycle would be controlled reasonably while better ensuring that the sealing glass paste finally obtained has an excellent performance. It can be understood that the weight percentage content of the light absorbing material may be 3%, 4% or 5%.

In another embodiment of the present invention, the ratio of the weight percentage contents of the glass powders and the ceramic filler is 2:1-10:1. The ratio of the weight percentage contents of the glass powders and the ceramic filler is limited within the above range mainly because the glass powders have relative high mechanical strength and expansion coefficient. Thus in this embodiment, a ceramic filler is added to improve the mechanical strength and expansion coefficient of the glass powders, thereby obtaining a sealing glass paste having excellent performances. It can be understood that a person skilled in the art can select a suitable proportion of ceramic filler in the above range. Optionally, the ratio of the weight percentage contents of the glass powders and the ceramic filler may be 3:1, 4:1, 5:1, 6:1, 7:1, 8:1 or 9:1, etc., preferably 2:1-4:1, more preferably 2:1.

In another embodiment of the present invention, the glass powders are selected from at least one of vanadium pentoxide, phosphorus pentoxide, zinc oxide, barium oxide and boron trioxide. The glass powders provided by the embodiment of the present invention have excellent mechanical strength and expansion coefficient. A person skilled in the art can reasonably extends to compounds based on this feature in actual applications, which is not limited in the embodiment of the present invention.

In another embodiment of the present invention, the ceramic filler is selected from at least one of aluminum oxide, silicon dioxide, zirconium dioxide, titanium dioxide and magnesium oxide. The ceramic filler selected in the embodiment of the present invention can well improve the mechanical strength and expansion coefficient of the glass powders. It can be understood that a person skilled in the art can reasonably extends the selected range of the ceramic filler according to actual applications, which is not limited in the embodiment of the present invention.

In another embodiment of the present invention, the light absorbing material is selected from at least one of silicon carbide, copper chrome black and iron manganese black. The light absorbing material selected in the embodiment of the present invention is an inorganic material with high temperature resistance, which can absorb the energy provided in laser heat melting well and can also be well mixed with other components in the formulation of sealing glass paste to obtain a well-mixed sealing glass paste. It can be understood that a person skilled in the art can reasonably extends the light absorbing material according to actual applications, those inorganic materials falls into the scope of protection of the present invention as long as it is suitable to be used as a light absorbing material.

In another embodiment of the present invention, the resin is selected from cellulosic resin or epoxy resin. In the paste provided in the embodiment of the present invention, the resin is used mainly as a binder for shaping the glass material well and adhering it on the joints. The cellulosic resin is selected from at least one of methyl cellulose, ethyl cellulose, carboxyethyl cellulose, carboxymethyl cellulose and carboxymethyl carboxyethyl cellulose. The epoxy resin is selected from methyl epoxy resin, hydroxymethyl biphenol A epoxy resin, etc. It can be understood that the selected range of the resin is not restricted in this embodiment.

In another embodiment of the present invention, the solvent is selected from at least one of terpineol, diethylene glycol butyl ester acetate, dipropyl ether, diethylene glycol monobutyl ester, 1,2-propylene oxide carbonate, ethylene glycol carbonate, triphenyl phosphate and tritolyl phosphate. In this embodiment, the solvent selected from the above range can dissolve the components well to obtain a well-mixed paste.

In an alternative embodiment of the present invention, the sealing glass paste provided may comprises a wetting leveling agent, an adhesion promoter, a dispersant, etc. The types of additives are well known by a person skilled in the art and are not further described herein.

An embodiment of the present invention provides a preparation method of a sealing glass paste, comprising adding a light absorbing material into the sealing glass paste. In this method, because a light absorbing material is added into the sealing glass paste, the light absorbing material can absorb energy effectively during the sealing of electronic products, thereby reducing the laser energy provided in the sealing process effectively while ensuring the sealing performance requirements. This method is simple and applicable, has good operability, and is suitable for large scale production.

Hereinafter, the sealing glass paste provided by the embodiments of the present invention will be specially explained with reference to special examples.

In the present invention, ten sealing glass pastes are prepared in Examples 1-10 according to the following method, and are tested in terms of sealing effect. The specific parameters and sealing effect are shown in the following Table 1.

The preparation method is as follows:

The glass powders, the ceramic filler, the light absorbing material, the resin and the solvent are weighted according to the certain weight percentage contents; and the above materials are mixed well to obtain sealing glass pastes 1-10. If some material has a larger particle size, the material may be grinded firstly and then added into the solvent to be well mixed.

Sealing glass pastes 1-10 prepared are coated on the joints by using a screen printing method, respectively.

Then each joint is heated. The heating process is mainly divided into two steps. In the first step, a majority of solvent is removed from the paste by heating. In the second step, the residual solvent and organic matters are removed from the paste by further heating.

After the above residues, i.e., the residual solvent and organic matters, have been removed, a laser heat melting method is used to seal the sealing parts with the sealing substrate and counter substrate both of which are provided with the formed sealing material. The sealing effects are observed.

TABLE 1 specific parameters and sealing effects in Examples 1-10

| | | Example | | | | | | | | | |
|---|---|---|---|---|---|---|---|---|---|---|---|
| | Material | 1 | 2 | 3 | 4 | 5 | 6 | 7 | 8 | 9 | 10 |
| Glass powders | $V_2O_5$ | 15 | 0 | 18 | 15 | 0 | 10 | 0 | 0 | 0 | 15 |
| | $P_2O_5$ | 0 | 0 | 5 | 0 | 5 | 0 | 10 | 10 | 5 | 0 |
| | ZnO | 25 | 15 | 20 | 25 | 15 | 8 | 10 | 10 | 15 | 25 |
| | BaO | 0 | 10 | 5 | 0 | 5 | 5 | 0 | 0 | 5 | 0 |
| | $B_2O_3$ | 5 | 15 | 0 | 5 | 19 | 0 | 5 | 2.5 | 19 | 5 |
| ceramic | $Al_2O_3$ | 8 | 6 | 5 | 5 | 3 | 3 | 6 | 8 | 3 | 5 |
| | $SiO_2$ | 6 | 0 | 10 | 0 | 3 | 3 | 6 | 10 | 3 | 0 |
| | ZrO | 5 | 3 | 0 | 0 | 0 | 0 | 3 | 3.5 | 0 | 0 |
| | $TiO_2$ | 0 | 4 | 5 | 0 | 4 | 4 | 0 | 0 | 4 | 0 |
| | MgO | 0 | 0 | 0 | 0 | 1 | 1 | 0 | 1 | 1 | 0 |
| Light absorbing material | silicon carbide | 5 | 0 | 0 | 4 | 0 | 3 | 0 | 0 | 0 | 2 |
| | copper chrome black | 0 | 4 | 0 | 0 | 4 | 0 | 0 | 0.5 | 2 | 0 |
| | iron manganese black | 0 | 0 | 5 | 0 | 0 | 0 | 1 | 0 | 0 | 0 |
| resin | ethyl cellulose | 10 | 14.2 | 9 | 15 | 15 | 22.5 | 21 | 22 | 15 | 15 |
| solvent | terpineol | 5 | 10 | 5 | 10 | 10 | 15 | 12 | 12 | 12 | 12 |
| | Tetraethylene glycol dimethyl ether | 15 | 18 | 12 | 20 | 15 | 25 | 25.4 | 20 | 15 | 20 |
| additives | BYK333 | 0.5 | 0.4 | 0.5 | 0.5 | 0.5 | 0.2 | 0.3 | 0.2 | 0.5 | 0.5 |
| | Z-6040 | 0.5 | 0.4 | 0.5 | 0.5 | 0.5 | 0.3 | 0.3 | 0.3 | 0.5 | 0.5 |
| Laser power (w) | | 16.5 | 14.5 | 18 | 14 | 14 | 15 | 19 | 19.5 | 20 | 21 |
| performance | | OK | OK | OK | OK | OK | OK | Crack | Crack | LSD | LSD |

LSD: damage of the sealing glass paste resulted from heat shock.

As can be seen from the content of the above table, because a light absorbing material is added into the sealing glass pastes provided by the examples of the present invention, the laser power required by the sealing glass pastes provided by the examples of the present invention during the laser heat melt sealing is lower, and the damage or cracking of the sealing material caused by heat shock are avoided very well, thereby increasing the yield of acceptable products.

The invention has been described with reference to some exemplary embodiments which are not limitative to the scope of the disclosure. The scope of the disclosure is defined by the accompanying claims.

The present application claims the benefits of the Chinese Application No. 201410587634.1 filed on Oct. 28, 2014, the entire disclosure of which is incorporated herein by reference.

The invention claimed is:

1. A sealing glass paste, comprising a light absorbing material, glass powders, a ceramic filler, a resin and a solvent; wherein, weight percentage contents of the glass powders, the ceramic filler, the light absorbing material, the resin and the solvent are:
   glass powders: 20%-22.5%;
   ceramic filler: 22.5%-25%;
   light absorbing material: 5%;
   resin: 10%-25%; and
   solvent: 20%-40%.

2. The sealing glass paste according to claim 1, wherein, the glass powders are selected from at least one of vanadium pentoxide, phosphorus pentoxide, zinc oxide, barium oxide and boron trioxide.

3. The sealing glass paste according to claim 1, wherein, the ceramic filler is selected from at least one of aluminum oxide, silicon dioxide, zirconium dioxide, titanium dioxide and magnesium oxide.

4. The sealing glass paste according to claim 1, wherein, the light absorbing material is selected from at least one of silicon carbide, copper chrome black and iron manganese black.

5. The sealing glass paste according to claim 1, wherein, the resin is selected from cellulosic resin or epoxy resin.

6. The sealing glass paste according to claim 1, wherein, the solvent is selected from at least one of terpineol, diethylene glycol butyl ester acetate, dipropyl ether, diethylene glycol monobutyl ester, 1,2-propylene oxide carbonate, ethylene glycol carbonate, triphenyl phosphate and tritolyl phosphate.

7. A preparation method of the sealing glass paste according to claim 1, comprising adding the light absorbing material into the sealing glass paste.

* * * * *